US008542566B2

(12) United States Patent
Usui et al.

(10) Patent No.: US 8,542,566 B2
(45) Date of Patent: Sep. 24, 2013

(54) HOLOGRAPHIC RECORDING METHOD DETECTING DISPLACEMENT OF A HOLOGRAPHIC RECORDING MEDIUM, AND RECORDING AND REPRODUCTION APPARATUS

(71) Applicants: Takashi Usui, Saitama (JP); Kazuo Watabe, Yokohama (JP); Hideaki Okano, Yokohama (JP)

(72) Inventors: Takashi Usui, Saitama (JP); Kazuo Watabe, Yokohama (JP); Hideaki Okano, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/684,435

(22) Filed: Nov. 23, 2012

(65) Prior Publication Data

US 2013/0077457 A1 Mar. 28, 2013

Related U.S. Application Data (63) Continuation of application No. PCT/JP2010/058813, filed on May 25, 2010.

(51) Int. Cl.
*G11B 7/0065* (2006.01)
*G11B 7/095* (2006.01)
*G11B 7/0045* (2006.01)

(52) U.S. Cl.
USPC ............... 369/53.34; 369/103; 369/53.18; 369/59.11

(58) Field of Classification Search
USPC ................. 369/44.33, 53.18, 53.42
See application file for complete search history.

(56) References Cited

U.S. PATENT DOCUMENTS

| 7,460,447 B2 * | 12/2008 | Kogure ............ 369/44.32 |
| 2006/0082851 A1 | 4/2006 | Toishi |
| 2007/0183008 A1 | 8/2007 | Kogure et al. |
| 2009/0080466 A1 | 3/2009 | Yamamoto et al. |

FOREIGN PATENT DOCUMENTS

| EP | 326343 A2 * | 8/1989 |
| JP | 10-105033 | 4/1998 |
| JP | 2006-106322 A | 4/2006 |
| JP | 2006349858 A * | 12/2006 |
| JP | 2007-127697 A | 5/2007 |
| JP | 2007-212221 A | 8/2007 |
| WO | WO 2006/092965 A1 | 9/2006 |

OTHER PUBLICATIONS

International Search Report issued Aug. 17, 2010 in PCT/JP2010/058813 filed May 25, 2010 (with English Translation).
Written Opinion issued Aug. 17, 2010 in PCT/JP2010/058813 filed May 25, 2010.

* cited by examiner

*Primary Examiner* — Hoa T Nguyen
*Assistant Examiner* — Mark Fischer
(74) *Attorney, Agent, or Firm* — Oblon, Spivak, McClelland, Maier & Neustadt, L.L.P.

(57) ABSTRACT

A method for recording information in form of a hologram. The method can generate a displacement signal by detecting a displacement of a holographic recording medium. The method can perform an exposure control operation that, if the sampling value of the displacement signal falls within an allowable displacement range, records the information item in the holographic recording medium, and if the sampling value of the displacement signal falls outside the allowable displacement range, blocks or reduces at least one of the information light and the reference light to a light intensity with which the information item is not recorded in the holographic recording medium.

12 Claims, 10 Drawing Sheets

HOLOGRAPHIC RECORDING METHOD DETECTING DISPLACEMENT OF A HOLOGRAPHIC RECORDING MEDIUM, AND RECORDING AND REPRODUCTION APPARATUS

CROSS REFERENCE TO RELATED APPLICATIONS

This application is a Continuation Application of PCT Application No. PCT/JP2010/058813, filed May 25, 2010, the entire contents of which are incorporated herein by reference.

FIELD

Embodiments described herein relate generally to a holographic recording method, and a recording and reproduction apparatus.

BACKGROUND

An optical information recording medium represented by a compact disc (CD), a Digital Versatile Disc (DVD), and a Blu-ray® Disc (BD) increases the recording density by mainly shortening the wavelength of a laser beam and increasing the numerical aperture (NA) of an object lens. It is, however, considered that a limit has almost been reached for technical reasons, and thus it is desirable to increase the recording density by other methods or schemes.

There have been developed a high-density volumetric optical recording memory (to be referred to as a holographic memory hereinafter) using holography, and a recording and reproducing apparatus for a holographic memory. Unlike a so-called surface recording method of recording a recording mark on a recording surface, such as a DVD, a holographic optical disk used for recording of a holographic memory uses a volumetric recording method with which it is possible to record data in the depth direction of an information recording layer, and thus a high recording density is obtained as compared with a DVD or the like.

For a DVD or the like, the recording mark generally represents on/off bit data. In contrast, for a holographic memory, a relatively large amount of information is modulated at once, and is recorded as interference fringes in a recording medium. The set of information is a modulation pattern for information light held in the recording medium, and is a smallest unit of a two-dimensional barcode with white and black dots for recording and reproduction, which is called a reproduction image (page data). Since it is possible to acquire a large amount of information by one recording or reproduction operation, a high transfer rate can be achieved.

DETAILED DESCRIPTION

A holographic recording method and a recording and reproduction apparatus according to an embodiment will be described in detail below with reference to the accompanying drawings. Note that in the following embodiment, parts with the same reference numeral perform the same operation, and a repetitive description thereof will be omitted as appropriate.

In one embodiment, a method for recording an information item to holographic recording medium in form of a hologram. The method can generate a displacement signal by detecting a displacement of a holographic recording medium in which an information item is recorded in a form of a hologram by interference of information light and reference light, the information light being emitted by a coherent light source and including the information item to be recorded, the reference light and the information light being the same wavelength. The method can calculate a frequency distribution information item of sampling values of the displacement signal, by sampling the displacement signal at a first interval time, assigning a frequency to one of classes which corresponds to a sampling value, the classes being a plurality of ranges divided at first intervals. The method can determine an allowable displacement range as an amplitude range of a displacement of the displacement signal based on the frequency distribution information item. The method can perform an exposure control operation that, if the sampling value of the displacement signal falls within the allowable displacement range, records the information item in the holographic recording medium, and if the sampling value of the displacement signal falls outside the allowable displacement range, blocks or reduces at least one of the information light and the reference light to a light intensity with which the information item is not recorded in the holographic recording medium.

A holographic recording and reproduction apparatus to which the embodiment is applicable will be described in detail with reference to FIG. 1.

A holographic recording and reproduction apparatus 100 according to the embodiment includes a displacement detector 101, a Laser controller 102, an Image sensor controller 103, a Reproduction angle controller 104, a Shutter controller 105, a Spatial light modulation controller 106, a Signal processor 107, a central processing unit (CPU) 108, a random access memory (RAM) 109, a read only memory (ROM) 110, an non-volatile RAM (NV-RAM) 111, an interface unit (IF) 112, a signal bus 113, and a holographic optical system 150. Furthermore, the holographic optical system 150 includes a Laser source 151, an image sensor 152, a rotary stage 153, a shutter 154, and a Spatial light modulator 155.

The holographic recording and reproduction apparatus 100 is used to record information in a holographic recording medium 130. The holographic recording medium 130 will be described later with reference to FIG. 2. The operation of the holographic optical system 150 will also be explained later with reference to FIG. 3.

The displacement detector 101 detects a displacement due to vibration of the holographic recording medium 130, and outputs an electrical signal (to also be referred to as a displacement signal hereinafter) corresponding to the detected displacement. For the displacement detector 101, a piezoelectric element, or an optical sensor such as a photonic sensor or laser displacement gage can be used. Note that a method of detecting the spot position of reference light reflected on the holographic recording medium 130 may be used, or any method as long capable of obtaining an electrical signal corresponding to the displacement of the medium may be used. The reference light has the same wavelength as that of information light, and is generally generated by the same light source as that of the information light. The reference light will be described later with reference to FIG. 3.

Although not shown, a reflection layer may be provided in the holographic recording medium 130 to detect a focus error signal like a conventional optical disk such as a CD or DVD, thereby acquiring a signal corresponding to the displacement of the holographic recording medium 130.

The Laser controller 102 controls the Laser source 151 to appropriately obtain a reproduction laser power and recording laser power set based on an instruction from the CPU 108 in recording or reproducing information. The Laser controller 102 also receives the displacement signal from the displacement detector 101, and modulates the intensity of the Laser source 151 based on the displacement signal. The operation of the Laser controller 102 will be described later with reference to FIG. 4.

The Image sensor controller 103 sets, in the image sensor 152, parameters for an image sensor which have been set based on an instruction from the CPU 108, in reproducing information, and sends, to the image sensor 152, a signal for triggering to start an image capturing operation based on an instruction from the CPU 108. The Image sensor controller 103 also records captured image data in the RAM 109.

In recording or reproducing information, the Reproduction angle controller 104 receives, from the CPU 108, an instruction for controlling an angle formed by the reference light and the holographic recording medium 130, and controls the rotary stage 153 based on the instruction.

In recording or reproducing information, the Shutter controller 105 controls to open/close the shutter 154.

In recording information, the Spatial light modulation controller 106 displays image data on the Spatial light modulator 155 based on information (recording data) to be recorded which is provided by a Host device 120 via the interface unit 112.

The Signal processor 107 executes reproduction signal processing and recording signal processing. For the reproduction signal processing, the signal processor 107 acquires image data via the signal bus 113, and executes processing for decoding the image data into digital data. For the recording signal processing, the signal processor 107 executes the inverse of the reproduction signal processing, that is, encodes the data.

Figure 1:
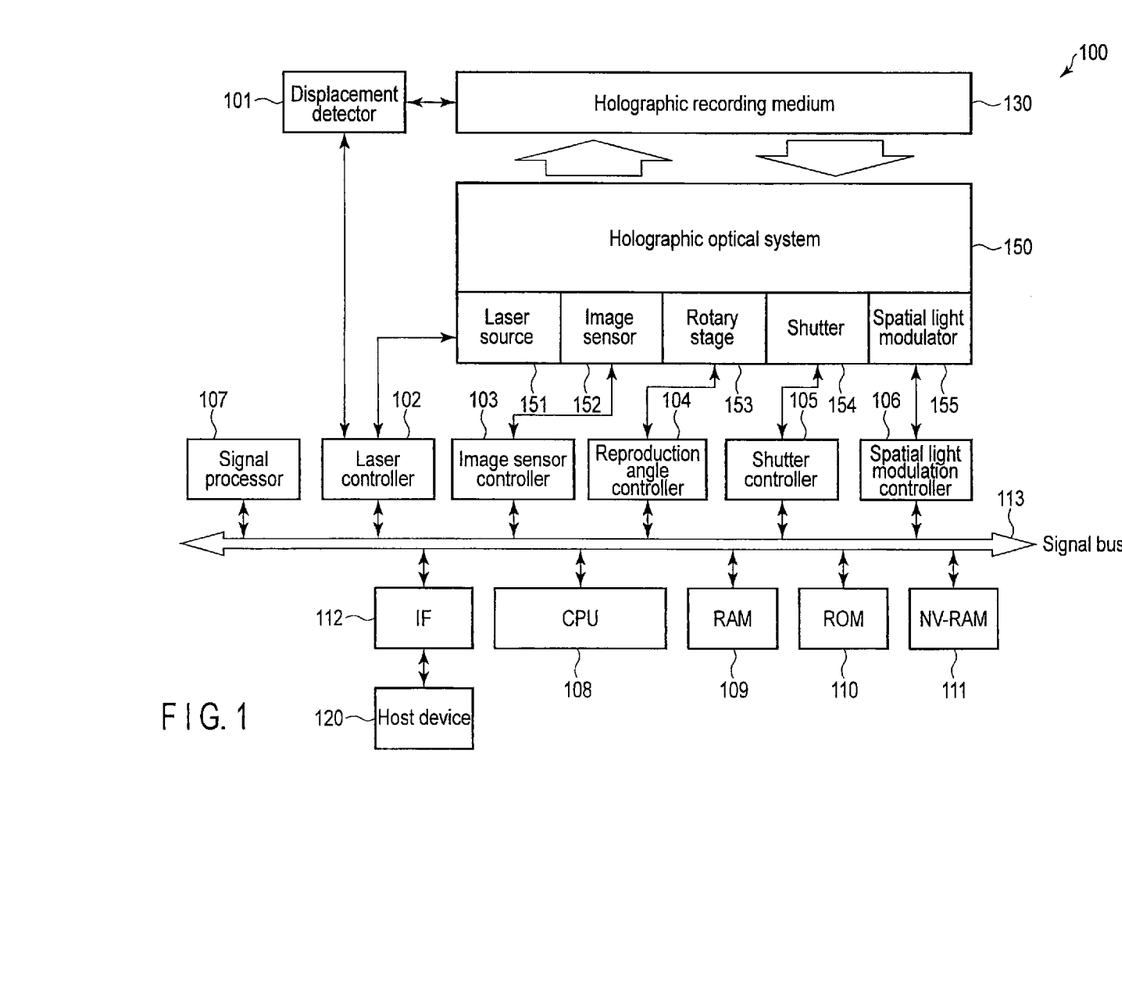
FIG. 1 is a block diagram illustrating a holographic recording and reproduction apparatus.

The CPU 108 controls all the components such as the controllers and memories shown in FIG. 1 via the signal bus 113. The CPU 108 controls the overall operation of the recording and reproduction apparatus according to an operation command provided by the Host device 120 via the interface unit 112. The CPU 108 uses the RAM 109 as a work area, refers to parameters for each apparatus, which have been recorded in the NV-RAM 111, as needed, and executes a predetermined operation according to a control program including a program recorded in the ROM 110.

The structure of the holographic recording medium 130 will now be described in detail with reference to FIG. 2.

Figure 2:
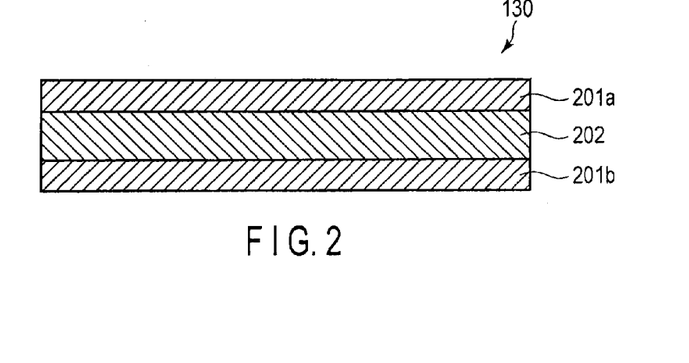
FIG. 2 is a view illustrating the structure of a holographic recording medium.

The holographic recording medium 130 is a transparent recording medium, and includes two substrates 201a and 201b which face each other, and a holographic recording layer 202 which is sandwiched between them, and stacked on the substrate 201b, as shown in FIG. 2.

The substrates 201a and 201b are made of an optically transparent material such as glass, polycarbonate, or acrylate resin. The material of the substrates 201a and 201b is not limited to them, and need only be made of a material having transparency for the wavelength of a laser beam to be used, since it is not necessary to have transparency for all the wavelengths of general laser beams.

The holographic recording layer 202 is made of a holographic recording material. The holographic recording material is to form a hologram by causing the information light of a laser beam to interfere with the reference light. The holographic recording material is generally a radical polymerization material called a photopolymer, which contains a radical polymerizable compound, radical photopolymerization initiator, and matrix material. Note that the holographic recording material is not limited to them, and any material may be used as long as holographic recording is possible.

Figure 3:
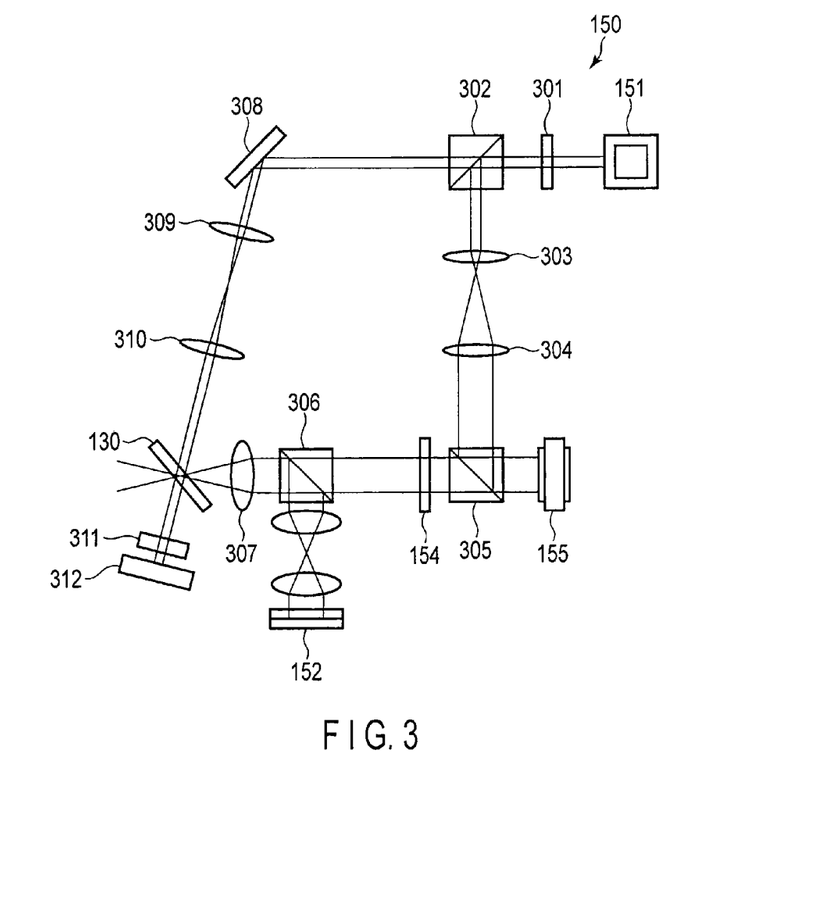
FIG. 3 is a block diagram illustrating the optical system of the holographic recording and reproduction apparatus.

The optical system of the holographic recording and reproduction apparatus 100 according to the embodiment will be described in detail with reference to FIG. 3.

The holographic optical system 150 includes the Laser source 151, quarter-wavelength plates 301 and 311, polarizing beam splitters 302, 305, and 306, the Spatial light modulator 155, lenses 303, 304, 309, and 310, the shutter 154, the image sensor 152, a condenser lens 307, a mirror 308, and a conjugate mirror 312.

In the embodiment, a two-beam optical system which guides the information light and reference light to the holographic recording medium 130 so as to be superimposed on each other on the holographic recording layer 202 via different object lenses is adopted. Note that a collimator lens for shaping a laser beam and the like are omitted from FIG. 3 in order to avoid complexity.

The Laser source 151 is a light source for emitting a laser beam for recording and reproduction, and is generally used in combination with a green or blue-violet semiconductor laser and an external resonator (not shown) for stabilizing the wavelength of the laser. Note that for the Laser source 151, another light source for emitting another wavelength, or a laser beam such as a so-called DFB laser beam, SHG laser beam, solid-state laser beam, or gas laser beam may be used.

The quarter-wavelength plate 301 converts the linear polarization of the laser beam emitted by the Laser source 151 into circular polarization, and polarizing beam splitter 302 splits the laser beam into two light beams. Of the two light beams, a first light beam which has been reflected by polarizing beam splitter 302 undergoes diameter adjustment by lenses 303 and 304, and is reflected by polarizing beam splitter 305 again to enter the Spatial light modulator 155, which performs modulation. Note that for the Spatial light modulator 155, a liquid crystal element, a digital micromirror device, or the like can be used. The Spatial light modulator 155 spatially modulates a laser beam to generate information light carrying information.

After that, polarizing beam splitters 305 and 306 transmit the first light beam modulated by the Spatial light modulator 155, which converges, as information light, on the holographic recording layer 202 of the holographic recording medium 130 through the condenser lens 307. Note that the shutter 154 is in an open state at this time, and never blocks the first light beam as information light.

On the other hand, of the two light beams split by polarizing beam splitter 302, a second light beam which has been transmitted by polarizing beam splitter 302 is reflected by the mirror 308, undergoes diameter adjustment by lenses 309 and 310, and irradiates, as reference light, the holographic recording layer 202 of the holographic recording medium 130.

To record a hologram in the holographic recording layer 202 of the holographic recording medium 130 by the above-described holographic optical system 150, the information light and reference light generated in the above-described processing are caused to irradiate the same position in the holographic recording layer 202 to be superimposed on each other, thereby forming interference fringes. At this time, a photopolymerization initiator contained in the photopolymer absorbs photons to be activated, and the polymerization of monomers in the bright portion of the interference fringes is activated. When the polymerization of the monomers progresses to consume the monomers existing in the bright portion of the interference fringes, monomers migrate from the dark portion of the interference fringes to the bright portion, resulting in a difference in density between the bright portion and dark portion of the interference fringe pattern. This forms refractive index modulation according to the intensity distribution of the interference fringe pattern, thereby enabling holographic recording. At this time, a necessary exposure time Tw as a time until sufficient refractive index modulation occurs, that is, a time required to record information in the holographic recording medium 130 has been determined or learned in advance based on the characteristics or multiplexing number of the medium, or a laser power, and is adjusted as needed, thereby allowing stable recording.

On the other hand, to reproduce information recorded in the holographic recording medium 130, the shutter 154 is set in a closed state to block the information light, and the second light beam is temporarily transmitted by the holographic recording medium 130 to pass through the quarter-wavelength plate 311, thereby causing only the reference light to enter the holographic recording medium 130. More specifically, the second light beam is reflected by the conjugate mirror 312 while its phase component is inverted to be conjugate, and then enters as reference light. That is, the holographic recording medium 130 is irradiated with reference light from a direction opposite to that in which the reference light is emitted when forming a hologram, thereby extracting reproduction light. In this way, by emitting the reference light from the opposite direction, the scale of the circuit of the holographic optical system 150 can be made small. The reproduction light extracted from the holographic recording medium 130 is obtained by the image sensor 152 after polarizing beam splitter 306 changes the direction to the vertically downward direction in FIG. 3. For the image sensor 152, a two-dimensional image sensor such as a CCD or CMOS can be used. The embodiment is not limited to this, a one-dimensional linear image sensor may be scanned and used as the image sensor 152, or a camera tube may be used.

It is preferable that the light path lengths of the information light and reference light to the holographic recording medium 130 are equal to each other to align their phases. The light path lengths, however, may be different from each other as long as they fall within an allowable range of the so-called coherent length of the Laser source 151.

Furthermore, a dichroic mirror may be arranged between the holographic recording medium 130 and the image sensor 152.

The practical control structure of the holographic recording and reproduction apparatus 100 according to the embodiment will be described with reference to FIG. 4.

In this example, a description will be provided using the displacement detector 101, holographic optical system 150, and Laser controller 102. The operation of the holographic optical system 150 is the same as that in FIG. 3, and a description thereof will be omitted. The Laser controller 102 includes a bandpass filter (BPF) unit 401, an analog-to-digital (A/D) converter 402, a digital signal processor (DSP) 403, a digital output (DIO) unit 404, and a Laser driver (LD Driver) 405.

The BPF 401 receives the displacement signal from the displacement detector 101, and removes a direct-current component and a high-frequency noise component from the displacement signal, thereby extracting a vibrational displacement signal having only information of a vibrational component.

The analog-to-digital converter 402 receives the vibrational displacement signal from the BPF 401, and digitizes the received vibrational displacement signal.

The DSP 403 receives the digitized vibrational displacement signal from the analog-to-digital converter 402, and generates a modulation signal based on the digitized vibrational displacement signal so as to record information in the holographic recording medium 130 when the displacement of the displacement signal in the amplitude direction falls within a predetermined range. Practical processing by the DSP 403 will be described later with reference to a flowchart shown in FIG. 6.

The digital output unit 404 receives the modulation signal from the DSP 403, and outputs a plurality of voltage signals according to the modulation signal. In this example, the digital output unit 404 outputs a two-valued voltage signal at high or low level. For a general TTL level, the digital output unit 404 outputs a voltage signal of 2.0 V or higher at high level, and a voltage signal of 0.8 V or lower at low level. Note that the embodiment is not limited to the two-valued signal, and a multiple-level voltage signal may be output.

The Laser driver 405 receives the two-valued voltage signal from the digital output unit 404, and modulates the signal so that the driving current of the Laser source 151 becomes a pulse, and outputs it, in synchronism with the timing when the two-valued voltage signal changes from high level to low level or low level to high level. That is, if the two-valued voltage signal is at high level, a current value corresponding to a laser intensity with which recording is performed for the holographic recording medium 130 is output. If the two-valued voltage signal is at low level, a current value corresponding to a laser intensity with which no recording is performed is output. The output current value is not limited to the two values, and a plurality of levels may be used. At least two levels are required, one of which corresponds to a laser intensity for recording, and the other of which corresponds to a laser intensity lower than that for recording.

Figure 4:
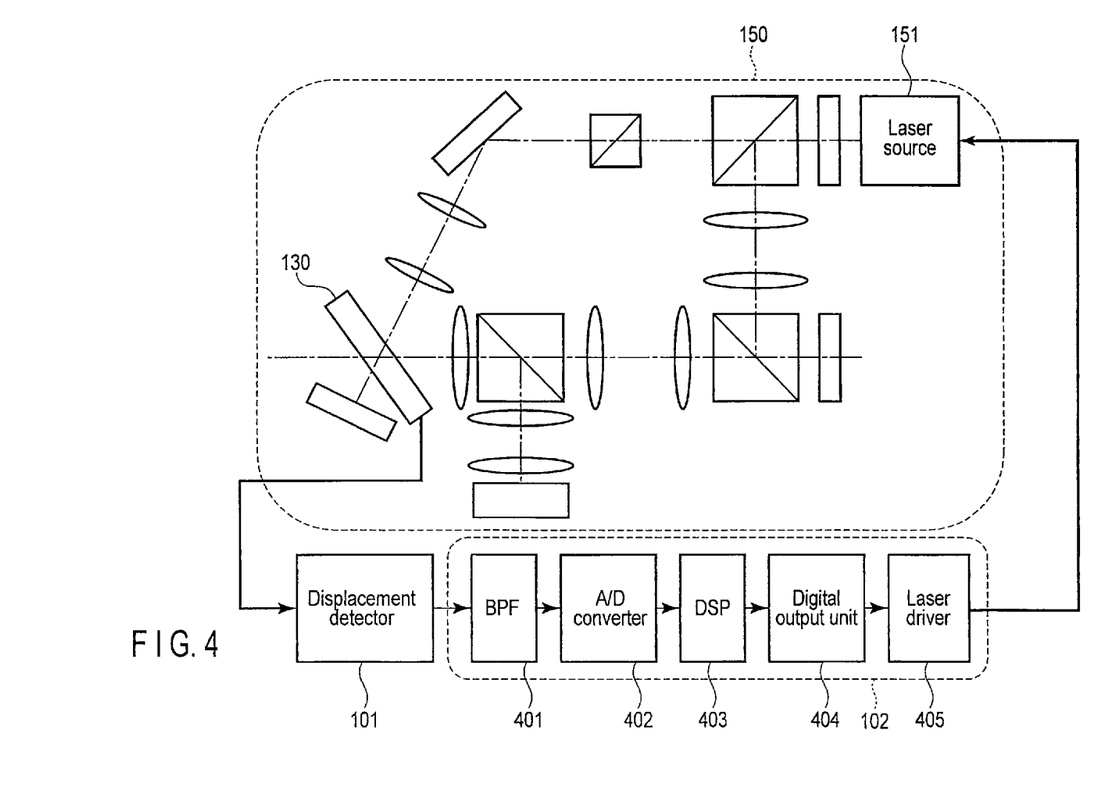
FIG. 4 is a view illustrating the control structure of the holographic recording and reproduction apparatus.

Although the BPF 401 is provided in the example shown in FIG. 4, it is not essential. As long as it is possible to directly extract the displacement state of the holographic recording medium 130 from the displacement signal without executing filtering processing, and process it, the output of the displacement detector 101 may be directly input to the analog-to-digital converter 402.

The arrangement of the DSP 403 will be described in detail with reference to FIG. 5.

The DSP 403 includes an offset cancellation unit 501, a frequency distribution calculator 502, a peak detector 503, a recording range determination unit 504, and a modulation signal generator 505. Note that the modulation signal generator 505, and the above-described digital output unit 404 and Laser driver 405 are collectively called an exposure control unit.

The offset cancellation unit 501 receives the digitized vibrational displacement signal from the analog-to-digital converter 402, and removes, from the vibrational displacement signal, the offset of a DC component which cannot be removed by the preceding BPF 401, such as the offset of the analog-to-digital converter, thereby generating a vibration signal.

The frequency distribution calculator 502 receives the vibration signal from the offset cancellation unit 501, and calculates, for the displacement of the vibration signal in the amplitude direction, a frequency distribution indicating a range in which the sampling values of the vibration signal are distributed, thereby generating frequency distribution information.

The peak detector 503 receives the frequency distribution information from the frequency distribution calculator 502, and detects, as a frequency center displacement, a maximum value in the frequency distribution information, that is, a value with a highest frequency of appearance.

The recording range determination unit 504 receives the frequency center displacement from the peak detector 503. When the recording range determination unit 504 receives a timing signal from the Host device 120, it determines an allowable displacement range based on the frequency center displacement.

The modulation signal generator 505 constitutes a window comparator, and receives the vibration signal from the offset cancellation unit 501. When the modulation signal generator 505 receives a timing signal from the Host device 120, it generates a two-valued modulation signal which is at high level when the timing signal indicates high level and the displacement of the vibration signal falls within the allowable displacement range, and which is at low level when the timing signal indicates high level and the displacement of the vibration signal falls outside the allowable displacement range. A case in which the timing signal indicates high level indicates a case in which information is recorded in the holographic recording medium. On the other hand, when the timing signal indicates low level, a modulation signal is fixed at low level, and is not changed.

Figure 6:
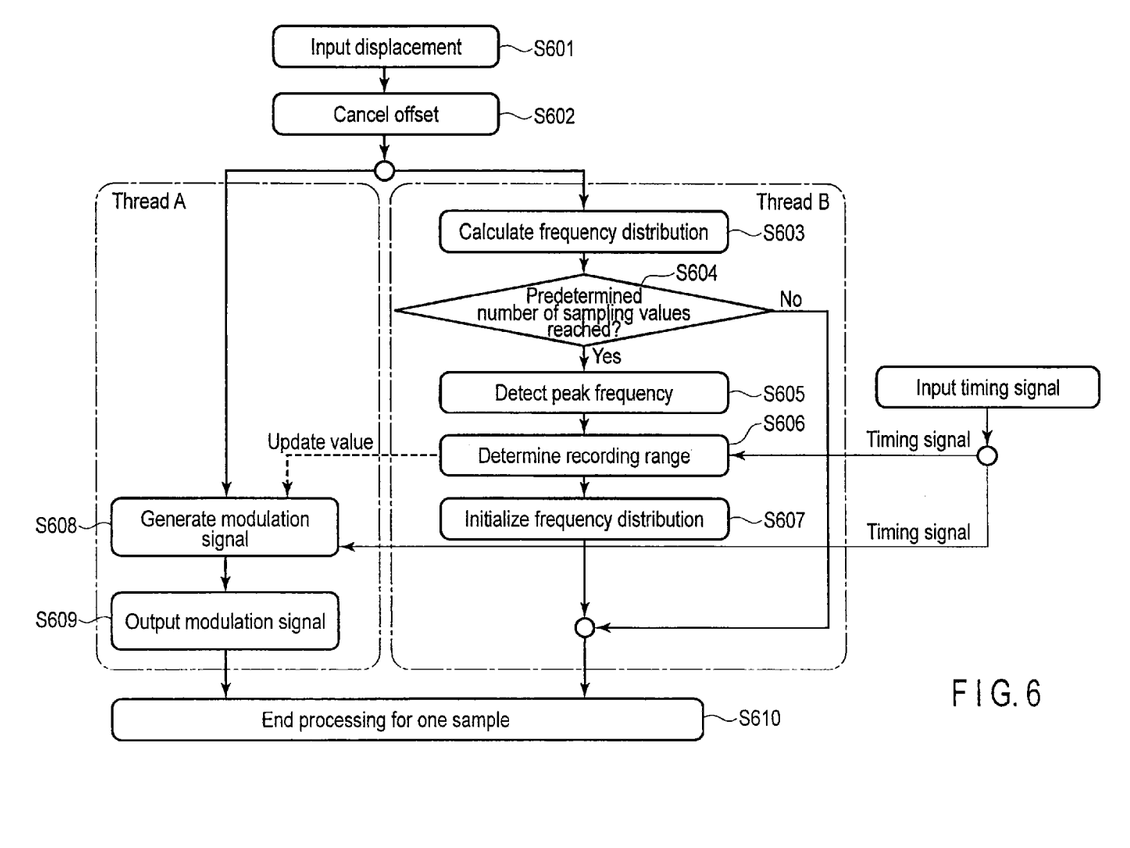
FIG. 6 is a flowchart illustrating the operation of laser control processing by the DSP.

The operation of the DSP 403 will be described in detail with reference to the flowchart shown in FIG. 6.

In step S601, the digitized vibrational displacement signal is input to the offset cancellation unit 501 from the analog-to-digital converter 402. Since a direct-current component has been removed from the digitized vibrational displacement signal, it is generally input to the offset cancellation unit 501 as a value which oscillates between positive and negative values with respect to zero as the center.

In step S602, the offset cancellation unit 501 removes, from the digitized vibrational displacement signal, the offset of the DC component which cannot be removed by the preceding BPF 401, such as the offset of the analog-to-digital converter, thereby generating a vibration signal.

Processing after step S602 is divided into two threads which are parallelly processed.

In step S603, the frequency distribution calculator 502 calculates, for the vibration signal, a displacement frequency distribution within a predetermined time, and generates frequency distribution information.

For the frequency distribution information, a frequency distribution associated with the displacement of the vibration signal within a sampling time Tl is generated. The time Tl is desirably equal to a necessary exposure time Tw but may be shorter than that. Assume that Ts represents a sampling interval. In this case, it is desirable to design Ts in advance so that the number of data points (Tl/Ts) is at least 50 or larger. Furthermore, a range R of the displacement frequency distribution is set to 4d where ±d represents an allowable range, a class number N indicating a division number when the range of the displacement frequency distribution is divided at regular intervals is set to N=20, and a class interval h is an integer obtained by calculating R/N. These numerical values Ts, R, N, and h are not limited to them, and are design requirements, which are appropriately designed for a target system. The allowable range±d is determined based on a holographic optical system and a laser wavelength, such that no interference occurs between pages even if dual recording is performed. The allowable range is set to be, for example, about half of the wavelength (0.2 μm), but is not limited to this.

Let a[n]=(n=0, 1, 2, . . . , N−1) be the end point of each class. Then, each end point is represented by:

$$a[0] = -d \quad (1)$$
$$a[1] = a[0] + h$$
$$a[2] = a[1] + h$$
$$\vdots$$
$$a[N-1] = a[N-2] + h$$

The frequency distribution calculator 502 counts the number of sampling values $V_{in}$ of the displacement signal included in each class. That is, if the sampling value of the displacement signal falls within the range of $a[k] \leq V_{in} < a[k]+h$ for each sampling period, a value indicating a frequency in a class n is stored in an array Hist[n] (n=0, 1, 2, . . . , N−1) by incrementing the values of the array Hist[k], thereby generating frequency distribution information.

In step S604, the frequency distribution calculator 502 determines whether or not the predetermined sampling time Tl has elapsed. If the predetermined sampling time Tl has not elapsed, that is, the number of sampling values has not reached a predetermined number, the process proceeds to step S610. On the other hand, if the predetermined sampling time Tl has elapsed, that is, the number of sampling values has reached the predetermined number, the process proceeds to step S605.

In step S605, the peak detector 503 searches for a maximum value in the array Hist[n] (n=0, 1, 2, . . . , N−1) based on the frequency distribution information to detect an array with a largest number of stored sampling values, that is, a class n=$n_{max}$ indicating a mode. At this time, the peak detector 503 calculates a frequency center displacement C' indicating the central value of the displacement of the displacement signal according to:

$$C' = -d + (n_{max} + 0.5) \times h$$

The peak detector unit 503 then generates central displacement information. Note that if there are a plurality of modes indicating peaks, it is only necessary to select one of them, and use it to calculate the frequency center displacement C' since the same effects are obtained even though any mode is selected.

In step S606, the recording range determination unit 504 synchronizes to a timing signal from the Host device 120. If the recording range determination unit 504 receives the timing signal, it determines an allowable displacement range C±d as the allowable amplitude range of the displacement signal when recording information in the holographic recording medium, by considering the frequency center displacement C' as an allowable center displacement C.

In step S607, the array Hist[n] of the frequency distribution calculator 502 is initialized.

In step S608, upon receiving a timing signal for instructing recording (high level) from the Host device 120, the modulation signal generator 505 generates a modulation signal $V_{out}$ (a two-valued signal at high or low level). More specifically, let $V_{in}$ be the vibration signal input from the offset cancellation unit 501, C±d (a unit is a value obtained by converting μm into a digital value) be the allowable displacement range determined by the recording range determination unit 504, and $V_{out}$ (a two-valued signal at high or low level) be the modulation signal. Then, the processing by the modulation signal generator 505 is represented by:

$$V_{out} = \begin{cases} \text{High:} & (C-d) \leq V_{in} \leq (C+d) \\ \text{Low:} & V_{in} < (C-d) \\ \text{Low:} & V_{in} > (C+d) \end{cases} \quad (2)$$

Until an update operation is executed using the allowable displacement range C±d newly determined by the recording range determination unit 504, the modulation signal generator 505 generates a modulation signal using the allowable displacement range before the update operation.

In step S609, a two-valued voltage signal at high or low level is output according to the modulation signal, and the process proceeds to step S610.

In step S610, the processing for one sampling value ends, and the same processing in steps S601 to S610 is executed for a next sampling value.

Note that by superimposing, by the Laser driver 405, on the modulation signal a bias current with a bias power or larger at low level and a power smaller than a recording power at high level, it is possible to suppress the occurrence of relaxation oscillations, and degradation in coherence. It is also possible to shorten a response delay from when a current is injected until light is emitted. As a result, this enables to shorten a delay time generated from when vibration occurs until modulation of a laser beam is performed, thereby obtaining effects for higher-frequency vibration.

The laser control operation of the holographic recording and reproduction apparatus 100 in recording data according to the embodiment will now be described in detail with reference to FIGS. 7 and 8.

Figure 7:
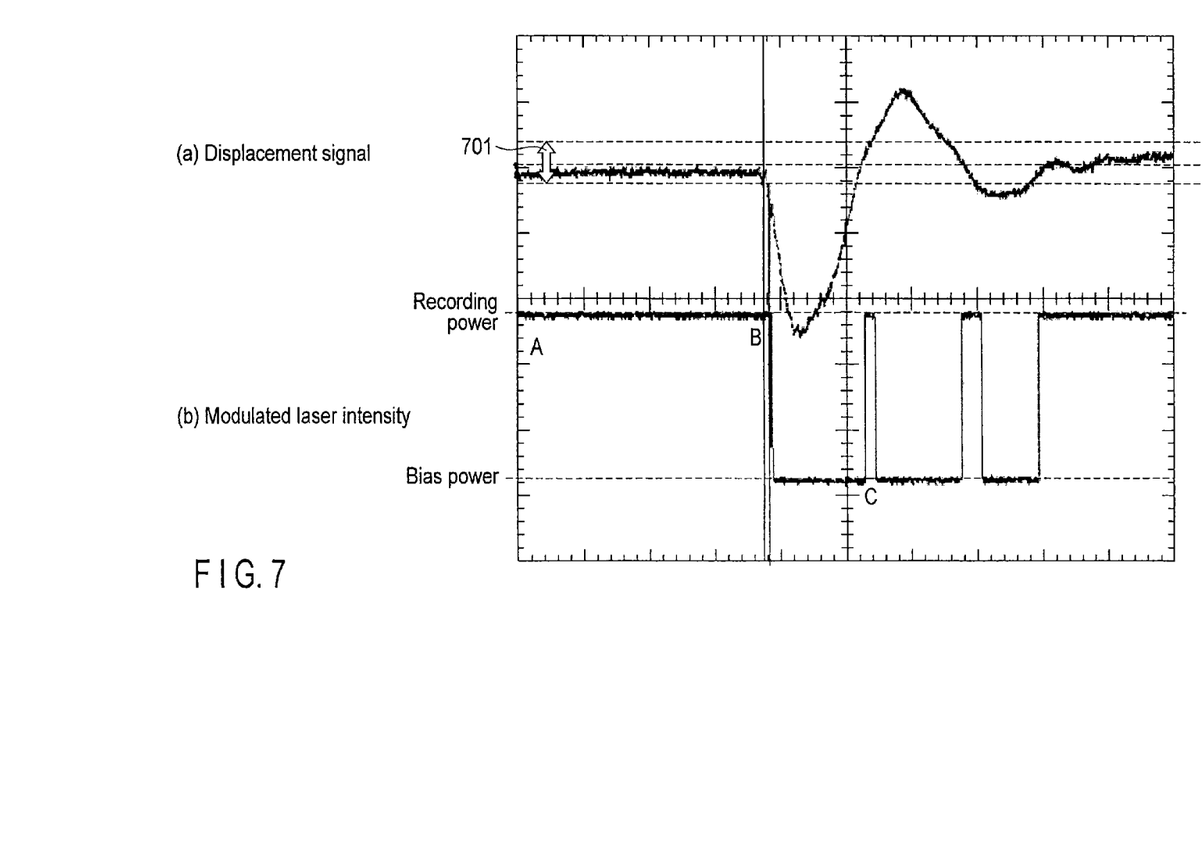
FIG. 7 is a view illustrating an example of the relationship between a time waveform and a laser intensity when the laser control processing is executed.

FIG. 7 shows the recording operation of the holographic recording and reproduction apparatus 100 when a stationary medium is suddenly vibrated. A curve (a) in the upper portion of FIG. 7 indicates a displacement signal representing the displacement of the holographic recording medium 130, which has been acquired by the displacement detector 101. A curve (b) in the lower portion of FIG. 7 represents a modulated laser intensity. While the holographic recording medium 130 stays still (from A to B), the modulation signal is set to high level, the laser intensity corresponds to a recording power, and thus a hologram is recorded in the holographic recording medium 130. At this time, an allowable displacement range 701 is indicated by an arrow in the upper portion of FIG. 7, and has, as its center, the stationary state of the displacement signal when the holographic recording medium 130 stays still. At a point B where the holographic recording medium 130 is vibrated and the displacement signal falls outside the allowable displacement range, the modulation signal is set to low level as represented by the curve (b), and the laser intensity corresponds to a bias power such that it does not contribute to recording. Until the potential falls within the allowable displacement range 701 again (from B to C), recording data in the holographic recording medium 130 is stopped. As described above, when the displacement signal falls within the allowable displacement range according to the displacement of the displacement signal, light is emitted, thereby inhibiting holographic recording in an unintended location of the holographic recording medium 130.

Figure 8:
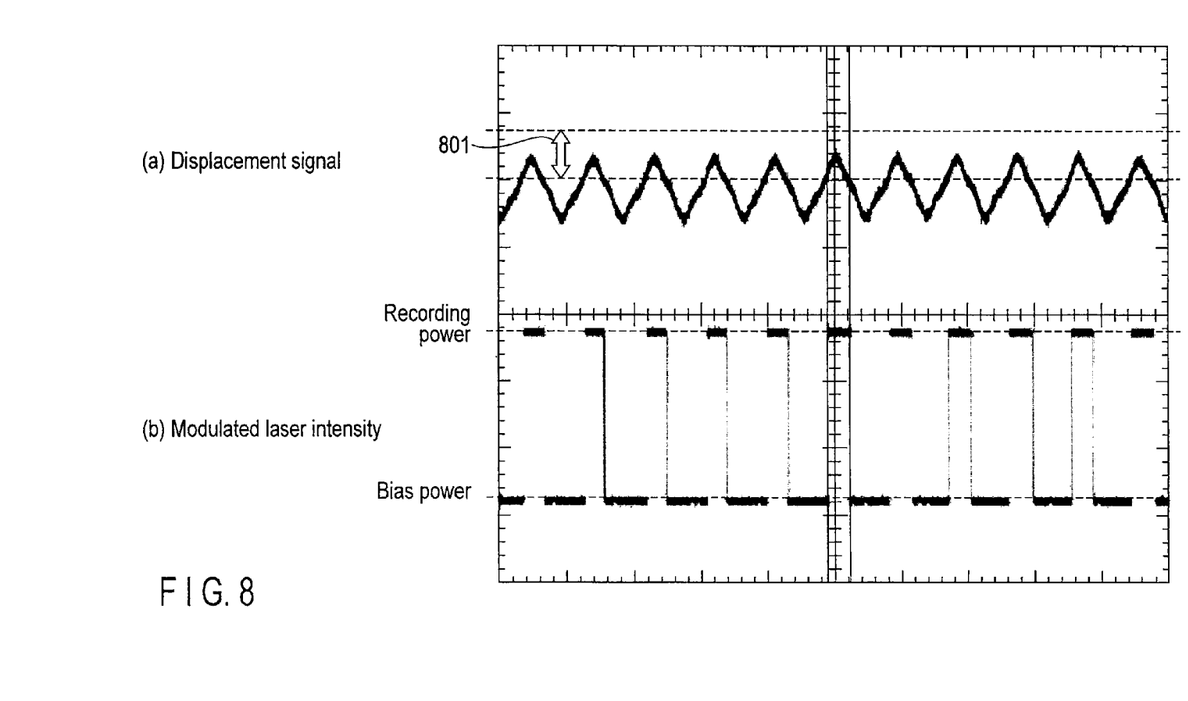
FIG. 8 is a view illustrating another example of the relationship between the time waveform and the laser intensity when the laser control processing is executed.

FIG. 8 shows the recording operation of the holographic recording and reproduction apparatus 100 when the holographic recording medium 130 regularly vibrates. A curve (a) in the upper portion of FIG. 8 indicates a displacement signal representing the displacement of the holographic recording medium 130, which has been acquired by the displacement detector 101. A curve (b) in the lower portion of FIG. 8 represents a modulated laser intensity.

A displacement frequency distribution at this time has a shape with two peaks, as indicated by the curve (a). In this case, a predetermined range having one of the peaks as its center is set as an allowable displacement range. An allowable displacement range 801 at this time is a range shifted from the center of vibration, like a range indicated by an arrow in the upper portion of FIG. 8. Consequently, the modulation laser intensity of a laser beam is modulated as indicated by the curve (b), and light is emitted with a recording power at only one of the peaks of the vibration. Since it is possible to estimate the displacement position of the holographic recording medium 130 by observing the frequency distribution, it is possible to efficiently record information in the same recording location, thereby enabling to record information in a short time as compared with the conventional technique.

Comparison of a reproduction image generated by the holographic recording and reproduction apparatus 100 according to the embodiment with that generated by a conventional method will be described in detail with reference to FIG. 9.

Figure 9:
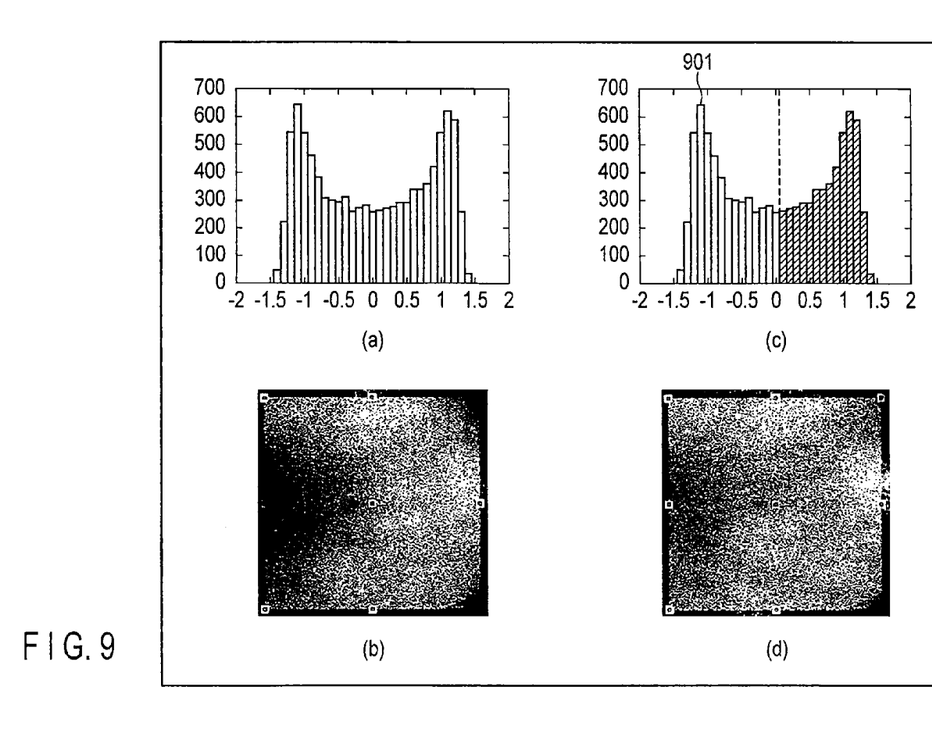
FIG. 9 is a view illustrating examples of frequency distribution information and a reproduction image when the laser control processing is executed.

Referring to FIG. 9, (a) shows frequency distribution information in regular vibration, and (b) shows the reproduction image of a hologram recorded using the conventional method when regular vibration occurs. As a result, due to the influence of the vibration, data are recorded in a plurality of recording locations of the holographic recording medium 130 to generate a non-reproduction region (for example, black regions in the right corners in (b) of FIG. 9), and degradation has occurred in the reproduction image. On the other hand, the holographic recording and reproduction apparatus 100 according to the embodiment records data in a range on the left side of the center including a mode 901 among frequency distribution information shown in (c) of FIG. 9, and recording is stopped in a shaded portion on the right side. Consequently, a reproduction image which is clear as a whole is obtained, which is a high-quality reproduction image, as shown in (d) of FIG. 9.

According to the above embodiment, by measuring the displacement of the holographic recording medium, and selecting a range with a highest displacement frequency distribution in the holographic recording medium in a displacement state to set an allowable displacement range within which information can be recorded in the holographic recording medium, it is possible to eliminate the influence of vibration irrespective of the vibrational state, and efficiently record a high-quality hologram in a desirable recording location of the holographic recording medium in a short time.

MODIFICATION OF EMBODIMENT

In a modification of the embodiment, when recording information in the holographic recording medium, an accumulated time during which information is recorded is counted, and exposure is stopped when a given period of time elapses. Counting the accumulated time avoids a case in which recording is not appropriately performed because an exposure time is not long enough, or a case in which recording is continued although recording cannot be appropriately performed when recording information, thereby enabling to reduce a wasteful recording time.

Figure 10:
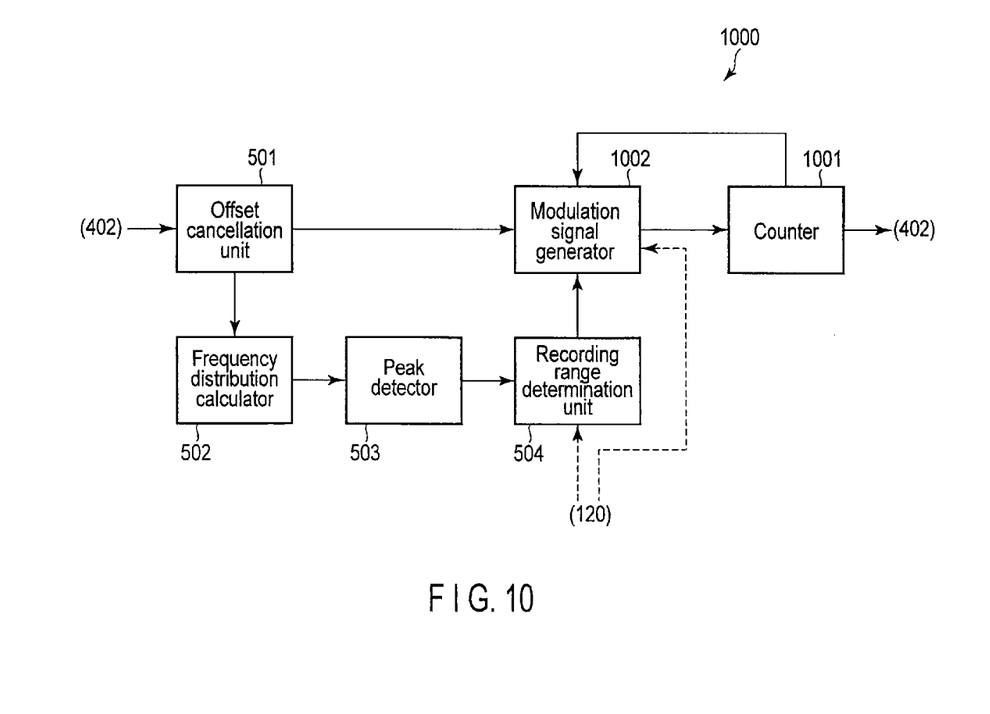
FIG. 10 is a block diagram illustrating a DSP according to a modification of the embodiment.

A DSP according to the modification will be described with reference to a block diagram shown in FIG. 10.

A DSP 1000 includes an offset cancellation unit 501, a frequency distribution calculator 502, a peak detector 503, a recording range determination unit 504, a counter 1001, and a modulation signal generator 1002. The offset cancellation unit 501, frequency distribution calculator 502, peak detector 503, and recording range determination unit 504 perform the same operations as those of the blocks shown in FIG. 5, and a detailed description thereof will be omitted.

The counter 1001 is, for example, a timer, and starts to count a time when the modulation signal generator 1002 receives a timing signal from the Host device 120, generates a modulation signal, and starts recording for the holographic recording medium 130. When a given period of time elapses, the accumulated count value is reset, and a reset signal indicating that the value has been reset is generated.

Figure 5:
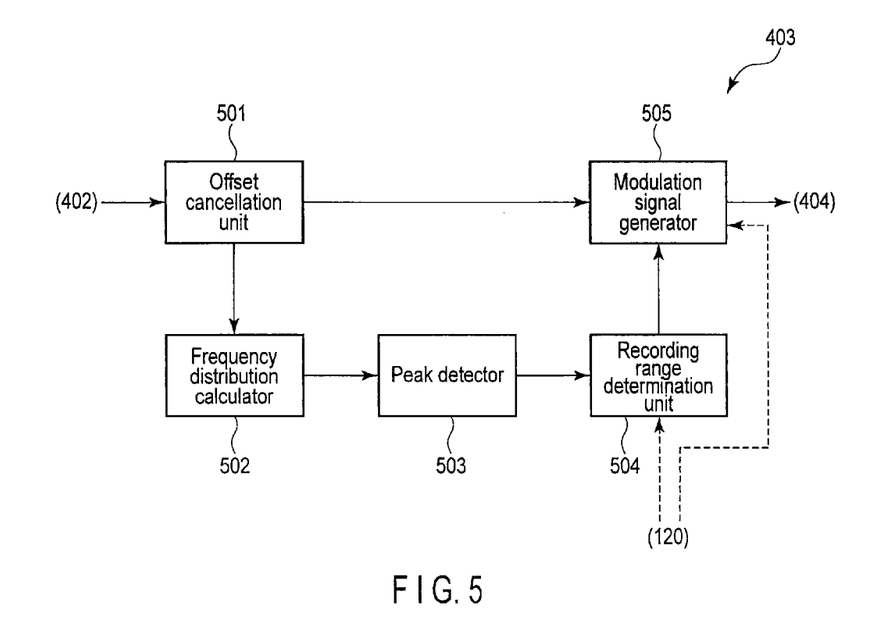
FIG. 5 is a block diagram illustrating a digital signal processor (DSP).

Upon receiving the reset signal indicating that the counter 1001 has reset the accumulated count value, the modulation signal generator 1002 executes the same operation as that of the modulation signal generator 505 shown in FIG. 5 except that the modulation signal generator 1002 generates, as a modulation signal, a voltage signal at low level.

Figure 11:
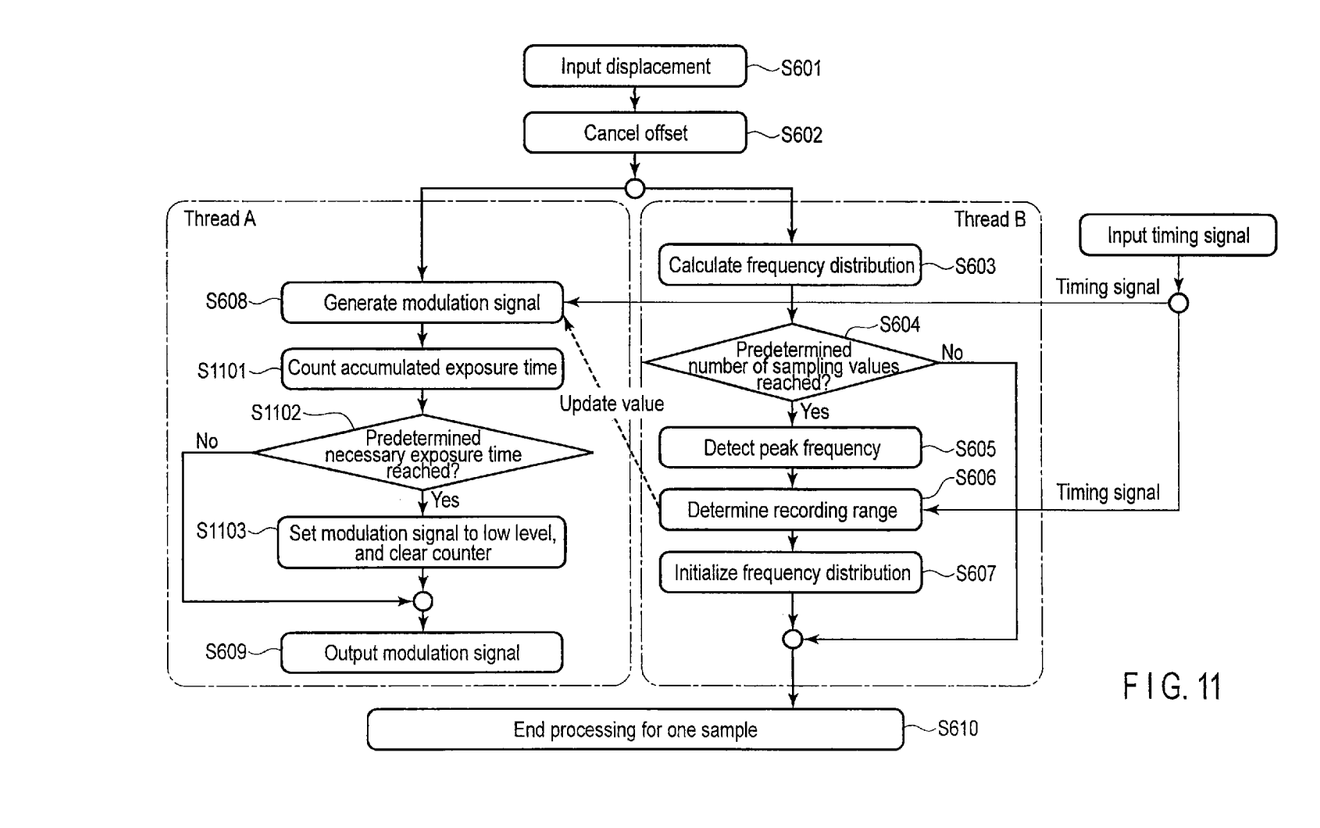
FIG. 11 is a flowchart illustrating the operation of laser control processing by the DSP according to the modification of the embodiment.

The operation of the DSP 1000 according to the modification will be described in detail with reference to a flowchart shown in FIG. 11. Note that steps S601 to S607, S609, and S610 of the flowchart shown in FIG. 11 are the same as those shown in FIG. 6, and a detailed description thereof will be omitted.

In step S608, the modulation signal generator 1002 starts an operation when an accumulated count value I (to be described later) is zero and a timing signal indicating high level is received from the Host device 120, and continues to generate a modulation signal for each sampling unless the accumulated count value I is zero.

In step S1101, after the modulation signal generator 1002 generates the modulation signal at high level in step S608, the counter 1001 starts to count an accumulated exposure time. The accumulated exposure time indicates a time during which recording is performed for the holographic recording medium 130, that is, an accumulated time counted only when the modulation signal is at high level.

In step S1102, the counter 1001 counts until the accumulated exposure time reaches the predetermined necessary exposure time Tw. The accumulated exposure time can be obtained according to the accumulated count value I×the sampling period Ts. If the accumulated exposure time reaches the necessary exposure time Tw, the process advances to step S1103; otherwise, the process advances to step S609 in which the modulation signal is output intact, and recording is continued.

In step S1103, the counter 1001 resets the accumulated count value I to zero while the modulation signal generator 1002 receives a reset signal from the counter 1001, and resets the modulation signal at low level.

The processing for one sampling value then ends, and the same processing is executed for a next sampling value.

In the above-described modification of the embodiment, measuring the accumulated exposure time by the count unit avoids a case in which recording is not appropriately performed because an exposure time is not long enough, or a case in which recording is continued although recording cannot be appropriately performed when recording information, thereby enabling to reduce a wasteful recording time.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A holographic recording method, comprising:
generating a displacement signal by detecting a displacement of a holographic recording medium in which an information item is recorded in a form of a hologram by interference of information light and reference light, the information light being emitted by a coherent light source and including the information item to be recorded, the reference light and the information light being the same wavelength;
calculating a frequency distribution information item of first sampling values of the displacement signal, by sampling the displacement signal at a first interval time to obtain the first sampling values and assigning frequencies to classes which correspond to the first sampling values, the classes being a plurality of ranges divided at first intervals;
determining an allowable displacement range as an amplitude range of a displacement of the displacement signal based on the frequency distribution information item; and
performing an exposure control operation that, if a second sampling value which is a latest sampling value of the displacement signal falls within the allowable displacement range, records the information item in the holographic recording medium, and if the second sampling value of the displacement signal falls outside the allowable displacement range, blocks or reduces at least one of the information light and the reference light to a light intensity with which the information item is not recorded in the holographic recording medium.

2. The method according to claim 1, further comprising calculating a frequency center displacement indicating a central value of the displacement of the displacement signal based on a max class in which a frequency is highest in the classes assigned the frequencies, by detecting the max class based on the frequency distribution information item,
wherein the determining the allowable displacement range calculates a first value by adding a positive value of a second value to the frequency center displacement, calculates a third value by adding a negative value of the second value to the frequency center displacement, and determines, as an allowable displacement range, a range defined by the first value and the third value.

3. The method according to claim 1, wherein the first interval time is not longer than a necessary exposure time required to record the information item in the holographic recording medium, and the determining the allowable displacement range updates the allowable displacement range upon receiving a timing signal indicating to start to record information in the holographic recording medium.

4. The method according to claim 3, wherein if starting the exposure control operation upon receiving the timing signal, an accumulated exposure time indicating an accumulated time during which recording is performed for the holographic recording medium is counted, and the performing the exposure control operation blocks or reduces, if the accumulated exposure time reaches the necessary exposure time, at least one of the information light and the reference light to the light intensity with which the information item is not recorded in the holographic recording medium.

5. The method according to claim 1, wherein the coherent light source is a semiconductor laser, and the performing the exposure control operation comprises outputting a modulation signal to pulse-modulate the semiconductor laser, and outputting an current to pulse-drive the semiconductor laser according to the modulation signal.

6. The method according to claim 5, wherein the outputting the current superimposes a bias current not smaller than a threshold current emitted by the semiconductor laser.

7. A holographic recording and reproduction apparatus, comprising:

a first detector configured to generate a displacement signal by detecting a displacement of a holographic recording medium in which an information item is recorded in a form of a hologram by interference of information light and reference light, the information light being emitted by a coherent light source and including the information item to be recorded, the reference light and the information light being the same wavelength;

a calculator configured to calculate a frequency distribution information item of first sampling values of the displacement signal, by sampling the displacement signal at a first interval time to obtain the first sampling values and assigning frequencies to classes which correspond to the first sampling values, the classes being a plurality of ranges divided at first intervals;

a determination unit configured to determine an allowable displacement range as an amplitude range of a displacement of the displacement signal based on the frequency distribution information item; and an exposure control unit configured to perform an exposure control operation that, if a second sampling value which is a latest sampling value of the displacement signal falls within the allowable displacement range, records the information item in the holographic recording medium, and if the second sampling value of the displacement signal falls outside the allowable displacement range, blocks or reduces at least one of the information light and the reference light to a light intensity with which the information item is not recorded in the holographic recording medium.

8. The apparatus according to claim 7, further comprising a second detector configured to calculate a frequency center displacement indicating a central value of the displacement of the displacement signal based on a max class in which a frequency is highest in the classes assigned the frequencies, by detecting the max class based on the frequency distribution information item, wherein the determination unit calculates a first value by adding a positive value of a second value to the frequency center displacement, calculates a third value by adding a negative value of the second value to the frequency center displacement, and determines, as an allowable displacement range, a range defined by the first value and the third value.

9. The apparatus according to claim 7, wherein the first interval time is not longer than a necessary exposure time required to record the information item in the holographic recording medium, and the determination unit updates the allowable displacement range upon receiving a timing signal indicating to start to record information in the holographic recording medium.

10. The apparatus according to claim 9, further comprising a counter configured to count, if starting the exposure control operation upon receiving the timing signal, an accumulated exposure time indicating an accumulated time during which recording is performed for the holographic recording medium, and wherein the exposure control unit performs blocking or reducing, if the accumulated exposure time reaches the necessary exposure time, at least one of the information light and the reference light to the light intensity with which the information item is not recorded in the holographic recording medium.

11. The apparatus according to claim 7, wherein the coherent light source is a semiconductor laser, further comprising a generator configured to output a modulation signal to pulse-modulate the semiconductor laser, and the exposure control unit comprises a laser driver configured to output an current to pulse-drive the semiconductor laser according to the modulation signal.

12. The apparatus according to claim 11, wherein the laser driver superimposes a bias current not smaller than a threshold current emitted by the semiconductor laser.

* * * * *